US010614926B2

(12) United States Patent
Lizin et al.

(10) Patent No.: US 10,614,926 B2
(45) Date of Patent: Apr. 7, 2020

(54) METHOD OF HANDLING RADIOACTIVE SOLUTIONS

(71) Applicant: STATE ATOMIC ENERGY CORPORATION "ROSATOM" ON BEHALF OF THE RUSSIAN FEDERATION, Moscow (RU)

(72) Inventors: Andrey Anatolievich Lizin, Ulyanovsk Region (RU); Sergey Vasilievich Tomilin, Ulyanovsk Region (RU); Sergey Stepanovich Poglyad, Ulyanovsk Region (RU)

(73) Assignee: STATE ATOMIC ENERGY CORPORATION "ROASTOM" ON BEHALF OF THE RUSSIAN FEDERATION, Moscow (RU)

( * ) Notice: Subject to any disclaimer, the term of this patent is extended or adjusted under 35 U.S.C. 154(b) by 0 days.

(21) Appl. No.: 16/478,291

(22) PCT Filed: Jan. 16, 2018

(86) PCT No.: PCT/RU2018/000010
§ 371 (c)(1),
(2) Date: Jul. 16, 2019

(87) PCT Pub. No.: WO2018/132041
PCT Pub. Date: Jul. 19, 2018

(65) Prior Publication Data
US 2019/0371483 A1 Dec. 5, 2019

(30) Foreign Application Priority Data
Jan. 16, 2017 (RU) .................................. 2017101380

(51) Int. Cl.
*G21F 9/16* (2006.01)
*C04B 35/46* (2006.01)
*C04B 35/64* (2006.01)
*G21F 9/08* (2006.01)
*G21F 9/30* (2006.01)

(52) U.S. Cl.
CPC .............. *G21F 9/162* (2013.01); *C04B 35/46* (2013.01); *C04B 35/64* (2013.01); *G21F 9/08* (2013.01); *G21F 9/302* (2013.01); *C04B 2235/3208* (2013.01); *C04B 2235/3217* (2013.01); *C04B 2235/3232* (2013.01); *C04B 2235/3244* (2013.01); *C04B 2235/3268* (2013.01); *C04B 2235/3272* (2013.01); *C04B 2235/656* (2013.01)

(58) Field of Classification Search
CPC ... G21F 9/16; G21F 9/162; G21F 9/08; G21F 9/302; C04B 35/46; C04B 35/64
USPC ........................................................ 588/10
See application file for complete search history.

(56) References Cited

FOREIGN PATENT DOCUMENTS

| CN | 103723915 A | 4/2014 |
|----|-------------|--------|
| CN | 104810072 A | 7/2015 |
| RU | 2131627 C1 | 6/1999 |
| RU | 2153717 C1 | 7/2000 |
| RU | 2197027 C2 | 1/2003 |
| RU | 2291504 C2 | 1/2007 |
| RU | 2315381 C1 | 1/2008 |

OTHER PUBLICATIONS

International Search Report of corresponding International Application No. PCT/RU2018/000010 dated Jun. 14, 2018, 4 pages.
Written Opinion of corresponding International Application No. PCT/RU2018/000010 dated Jun. 14, 2018, 8 pages.

*Primary Examiner* — Edward M Johnson
(74) *Attorney, Agent, or Firm* — Brooks Kushman P.C.

(57) ABSTRACT

The invention relates to the field of environmental protection, more specifically to the field of processing radioactive waste, and can he used for the safe and effective handling of a large quantity of liquid radioactive waste of various activity levels that has been formed as the result of decontaminating protective equipment of boxes and chambers, and makes it possible to decrease the volume of stored waste by solidifying same and incorporating same into a ceramic matrix. For this purpose, radioactive solutions after decontamination of surfaces of protective equipment are evaporated as alkaline and acidic solutions containing sodium hydroxide, potassium permanganate, oxalic acid, and nitric acid until a solid residue forms, and are calcined, and the calcinate is mixed with components of a fusion mixture containing oxides of titanium, calcium, iron (III), zirconium, and manganese (IV) and aluminum in a specified ratio, and fused.

3 Claims, No Drawings

METHOD OF HANDLING RADIOACTIVE SOLUTIONS

CROSS-REFERENCE TO RELATED APPLICATIONS

This application is the U.S. national phase of PCT Application No. PCT/RU2018/000010 filed Jan. 16, 2018, which claims priority to Russian Patent Application No. RU 2017101380 filed Jan. 16, 2017, the disclosures of which are incorporated in their entirety by reference herein.

The invention relates to the field of environmental protection, more specifically to the field of processing radioactive waste, and can be used for the safe and effective handling of a large quantity of liquid radioactive waste of various activity levels that has been formed as the result of decontaminating protective equipment of boxes and chambers, and makes it possible to decrease the volume of stored waste by solidifying the same and incorporating the same into a ceramic matrix.

A method is known for incorporating radioactive waste into ceramic materials (RF Patent No. 2153717, G21F9/16) consisting in that radioactive waste containing radionuclides U, Th, Am, Cm, Pu, and Np, as well as radioactive rare-earth elements Zr, Mo, Ru, Cs, Pd, Sr, Ba, and Rb, is subjected to thermal concentration, the concentrate is mixed with oxides in the following component proportions, wt %: radioactive waste concentrate (in terms of oxides)—15-30; $TiO_2$—50-60; CaO—5-10; $ZrO_2$—5-20; $Al_2O_3$—3-5; BaO—3-10, the resulting fusion mixture is then mixed with a carbon-containing material taken in an amount of 3-10 wt % of the total fusion mixture weight, and the moisture content of the resulting carbon-containing fusion mixture is brought to 5-20 wt %. The carbon-containing fusion mixture with a moisture content of 5-20 wt % is then fed onto the surface of a molten ceramic material having a working temperature of 1,400-1,500° C., the mixture of the carbon-containing fusion mixture and the molten ceramic material is held until a homogenized melt is formed, wherein the working temperature of the molten ceramic material is maintained by constantly heating it while feeding the carbon-containing fusion mixture and maintaining it, after which the homogenized melt is cooled down to form a monolithic ceramic material (Synroc) with radioactive waste included therein (the final product), which is suitable for long-term storage, and the entire process of the incorporation of radioactive waste into the ceramic material is carried out at a pressure below atmospheric pressure. Thermal concentration is carried out by the incomplete dehydration (evaporation or drying) of radioactive waste, which always contains water, wherein the use of incompletely dehydrated radioactive waste instead of calcinate prevents dust formation at the stage of fusion mixture preparation, which increases the safety of the method as implemented. The thermally concentrated radioactive waste is not only incorporated into the resulting Synroc ceramic material, but is also one of the starting components for the synthesis of perovskite, zirconolite and hollandite, which are parts thereof.

The disadvantages of the proposed method are as follows:
  high energy consumption;
  the fusion mixture should be continuously mixed with the carbon-containing material to maintain a constant melting temperature for the material in the range of 1,400-1,500° C., which requires the use of additional batchers;
  the process is carried out at a pressure below atmospheric pressure, which requires the use of additional equipment to create a vacuum;
  conducting the process in an induction melter requires induction melting equipment (high-frequency radiation generators, high feed currents and, in some cases, water-cooling systems).

A method for immobilizing the high-level waste in a ceramic matrix (RF Patent No. 2315381 of May 22, 2006, "Method for immobilizing high-level waste in a ceramic matrix", G21F 9/16) is the closest equivalent, having the greatest number of substantial features in common with the claimed invention.

Said method comprises calcinating (denitrating) of high-level waste and mixing of the same with oxides (in the following proportions: calcinate of high-level waste—10 to 20 wt %; $TiO_2$—50 to 60 wt %; CaO—7.5 to 12.5 wt %; MnO—7.5 to 12.5 wt %; $FeO_3$—2.5 to 7.5 wt %; $Al_2O_3$—2.5 to 7.5 wt %), heating the resulting mixture at a pressure not lower than atmospheric pressure to the maximum working temperature of 2,000° C., holding at the working temperature and cooling until a monolithic material is formed.

Said method is designed to incorporate high-level waste with a high content of actinides and rare-earth elements, and is aimed at the immobilization and long-term geological storage of the actinide and rare-earth fraction of radioactive waste formed during the processing of spent nuclear fuel. The proposed method does not describe the possibility of incorporating high-salt waste containing significant amounts of alkali metal cations, including those containing components of acidic and alkaline solutions used to decontaminate protective equipment.

The process is highly energy-consuming.

The objective of this technical solution is to create a reliable and simple method for immobilizing non-process waste to produce a monolithic material suitable for long-term geological storage.

To achieve this objective, a method is proposed for handling radioactive solutions after decontamination of the surfaces of the protective equipment, which method comprises the combined evaporation of alkaline and acidic solutions with subsequent calcination, the mixing of the calcinate with the components of the fusion mixture containing oxides of titanium, calcium, iron (III) and aluminum in certain proportions, and the thermal treatment and combined melting of all components to produce a ceramic matrix, characterized in that zirconium and manganese oxides are further introduced into the mixture of calcinate and oxides of titanium, calcium, iron (III) and aluminum in the following component proportions, wt %:

| | |
|---|---|
| Calcinate of high-level waste | 10.0-20.0 |
| $TiO_2$ | 53.0-57.0 |
| CaO | 9.0-11.0 |
| $Fe_2O_3$ | 4.5-5.5 |
| $Al_2O_3$ | 4.5-5.5 |
| $ZrO_2$ | 4.5-5.5, | and the total content of $MnO_2$ in the mixture does not exceed 10 wt %.

The solid residue resulting from the evaporation of decontaminating solutions is calcined at 750 to 800° C. to fully decompose nitrates and carbonates.

The calcinate is fused with the fusion mixture at 1,350° C. or higher for 1 hour to produce a monolithic fused ceramic material.

The presence of zirconium and manganese dioxides in the fusion mixture reduces the ceramic melting temperature, which makes the process less energy-consuming.

The manganese oxide content of the fusion mixture varies depending on the actual content of potassium permanganate in process solutions after decontamination in terms of manganese.

A manganese dioxide content in the fusion mixture of above 10% is inexpedient, since it raises the melting temperature of the mixture.

If the zirconium dioxide content is below the lower limit, the phase composition of the ceramic material may change.

It is inexpedient to increase the content of zirconium dioxide in the fusion mixture to above 5.5%.

When said process operations are implemented, the solutions after decontamination can be evaporated to salts, and after the heat treatment thereof to form oxides, they can be mixed with the components of the fusion mixture to produce a ceramic material, which in turn can be obtained by fusing all the components to form a monolithic material suitable for the long-term geological storage of radioactive waste.

Decontaminating solutions of two compositions, acidic (containing 5% $HNO_3$, 0.5% $H_2C_2O_4$ and 0.5% EDTA) and alkaline (containing 0.5% $KMnO_4$ and 5% NaOH), were mixed together in equal volume proportions. The resultant solution was evaporated at 95° C., and after the water had evaporated, the temperature was raised to 350° C. The resultant residue was mixed with the components of the ceramic fusion mixture containing oxides of titanium, manganese (IV), aluminum, iron (III), calcium, and zirconium in such a way, that the composition of the resulting ceramic material conformed to the component proportions listed in Table 1. Due to the presence of hygroscopic sodium hydroxide in the residue resulting from the evaporation of decontaminating solutions (melting point: 323° C.), the product does not become perfectly dry after evaporation and heat treatment at 350° C. and does not require additional introduction of moisture-rich products to prevent dust formation. This reduces the emission of aerosols when the product is mixed with the fusion mixture and simplifies the process conditions for melting the target ceramic material.

The manganese oxide content may be adjusted depending on the actual content of potassium permanganate in process solutions after decontamination in terms of manganese. If the acidic and alkaline solutions are not uniformly mixed, and if the potassium permanganate fraction in the process radioactive solutions is increased or reduced, the composition shown in Table 1 can be adjusted by reducing or increasing the $MnO_2$ content in the initial fusion mixture.

After mixing the solidified solutions with the fusion mixture components, the entire composition is heat-treated at 800° C. to decompose nitrates and carbonates, and the resulting composition is then melted at 1,350° C. for 1 hour. According to the X-ray phase analysis data, the melted material obtained after cooling to room temperature is formed by the main phase with the murataite structure (with the cubic crystal lattice parameter a=14.63±0.01 A) and the additional phase with the perovskite structure. The leaching rates of the main components (cations) of the matrix is in the range of $10^{-6}$-$10^{-7}$ g/cm$^2$ per 2.4 hours when the material is leached in hot bidistilled water at 90° C. (samples are taken on the 3rd, 7th and 14th days).

TABLE 1

Compositions for producing ceramic material

| Component | Content, mass fraction % |
|---|---|
| $TiO_2$ | 55.00 |
| $MnO_2$ | 8.94 |
| CaO | 10.00 |
| $AL_2O_3$ | 5.00 |
| $Fe_2O_3$ | 5.00 |
| $ZrO_2$ | 5.00 |
| Waste (dry residue resulting from evaporation of decontaminating solutions) | 11.06 |

The invention claimed is:

1. A method for handling radioactive solutions after decontamination of the surfaces of protective equipment, the method comprising the combined evaporation of alkaline and acidic solutions containing sodium hydroxide, potassium permanganate, oxalic acid and nitric acid to a solid residue, with subsequent calcination and mixing of the calcinate with the components of the fusion mixture containing oxides of titanium, calcium, iron (III) and aluminum in certain proportions, and the combined melting of all components to produce a ceramic matrix, wherein zirconium and manganese (IV) oxides are further introduced into the mixture of the calcinate and oxides of titanium, calcium, iron (III) and aluminum in the following component proportions, wt %:

| | |
|---|---|
| Calcinate of high-level waste | 10.0-20.0 |
| $TiO_2$ | 53.0-57. |
| CaO | 9.0-11.0 |
| $Fe_2O_3$ | 4.5-5.5 |
| $Al_2O_3$ | 4.5-5.5 |
| $ZrO_2$ | 4.5-5.5 | and the total content of $MnO_2$ in the mixture does not exceed 10 wt %.

2. The method of claim 1, wherein the solid residue resulting from the evaporation of decontaminating solutions is calcined at 750 to 800° C. to fully decompose nitrates and carbonates.

3. The method of claim 1, wherein the calcinate is fused at 1,350° C. or higher for 1 hour to produce a monolithic fused ceramic material.

* * * * *